US009432689B2

(12) United States Patent
Oh (10) Patent No.: US 9,432,689 B2
(45) Date of Patent: Aug. 30, 2016

(54) METHOD OF DECODING MOVING PICTURE

(71) Applicant: M&K Holdings Inc., Seoul (KR)

(72) Inventor: Soo Mi Oh, Gyeonggi-Do (KR)

(73) Assignee: M & K HOLDINGS INC, Seoul (KR)

( * ) Notice: Subject to any disclaimer, the term of this patent is extended or adjusted under 35 U.S.C. 154(b) by 0 days.

(21) Appl. No.: 14/812,157

(22) Filed: Jul. 29, 2015

(65) Prior Publication Data
US 2015/0334414 A1 Nov. 19, 2015

Related U.S. Application Data

(63) Continuation of application No. 13/624,814, filed on Sep. 21, 2012, now Pat. No. 9,113,163.

(51) Int. Cl.
*H04N 19/513* (2014.01)
*H04N 19/52* (2014.01)
*H04N 19/44* (2014.01)
*H04N 19/105* (2014.01)
(Continued)

(52) U.S. Cl.
CPC ............ *H04N 19/52* (2014.11); *H04N 19/105* (2014.11); *H04N 19/107* (2014.11); *H04N 19/129* (2014.11); *H04N 19/134* (2014.11); *H04N 19/176* (2014.11); *H04N 19/18* (2014.11); *H04N 19/44* (2014.11); *H04N 19/503* (2014.11); *H04N 19/513* (2014.11); *H04N 19/593* (2014.11); *H04N 19/91* (2014.11)

(58) Field of Classification Search
CPC .......................... H04N 19/107; H04N 19/513
See application file for complete search history.

(56) References Cited

U.S. PATENT DOCUMENTS

2012/0230408 A1* 9/2012 Zhou .................... H04N 19/105
375/240.15
2014/0126643 A1* 5/2014 Park ...................... H04N 19/52
375/240.16

(Continued)

FOREIGN PATENT DOCUMENTS

KR 1020050013847 2/2005
KR 1020080065057 7/2008

(Continued)

OTHER PUBLICATIONS

Nguyen et al., "Improved Context; Modeling for Coding Quantized Transform Coefficients in Video Compression", 28th Picture Coding Symposium, PCS2010, Dec. 8-10, Nagoya, Japan, pp. 378-381.*

(Continued)

*Primary Examiner* — James Pontius
(74) *Attorney, Agent, or Firm* — Mintz Levin Cohn Ferris Glovsky and Popeo, P.C.; Kongsik Kim; Jonathon Western (57) ABSTRACT

Provided is a method that generates a prediction block of a current prediction unit, and generates a residual block of the current prediction unit. To generate the prediction block, a reference picture index and motion vector difference of the current prediction unit are obtained from a received bit stream, spatial and temporal motion vector candidates are derived to construct a motion vector candidate list. A motion vector predictor is selected and a motion vector of the current prediction unit is restored to generate the prediction block. Therefore, the motion vector encoded effectively using spatial and temporal candidates is correctly recovered and the complexity of a decoder is reduced.

4 Claims, 5 Drawing Sheets

(51) Int. Cl.
*H04N 19/107* (2014.01)
*H04N 19/503* (2014.01)
*H04N 19/176* (2014.01)
*H04N 19/134* (2014.01)
*H04N 19/129* (2014.01)
*H04N 19/593* (2014.01)
*H04N 19/18* (2014.01)
*H04N 19/91* (2014.01)

(56) References Cited

U.S. PATENT DOCUMENTS

| | | | | |
|---|---|---|---|---|
| 2014/0161186 A1* | 6/2014 | Zhang | | H04N 19/00696 375/240.16 |
| 2014/0241424 A1* | 8/2014 | Oh | | H04N 19/0009 375/240.03 |
| 2014/0301467 A1* | 10/2014 | Thirumalai | | H04N 19/597 375/240.16 |
| 2014/0307799 A1* | 10/2014 | Oh | | H04N 19/159 375/240.16 |
| 2014/0348241 A1* | 11/2014 | Lim | | H04N 19/52 375/240.16 |
| 2014/0362924 A1* | 12/2014 | Zhao | | H04N 19/52 375/240.16 |
| 2015/0049814 A1* | 2/2015 | Sung | | H04N 19/597 375/240.16 |

FOREIGN PATENT DOCUMENTS

| | | | |
|---|---|---|---|
| KR | 1020100121972 | | 11/2010 |
| WO | WO 2009/115901 | * | 9/2009 |
| WO | WO-2010/078212 | | 7/2010 |

OTHER PUBLICATIONS

Sole et al., "Unified scans for the significance map and coefficient level coding in high coding efficiency", JCT-VC (Joint Collaborative Team on Video Coding of ITU-T SG16 WP3 and ISO/IEC JTC1/SC29/WG11) 5. Geneva Switzerland, Mar. 16-23, 2011, No. JCTVC-E335, pp. 1-5.*

Nguyen et al., "Improved Context; Modeling for Coding Quantized Transform Coefficients in Video Compression", 28$^{th}$ Picture Coding Symposium, PCS2010, Dec. 8-10, Nagoya, Japan.

Sole et al., "Unified scans for the significance map and coefficient level coding in high coding efficiency", JCT-VC (Joint Collaborative Team on Video Coding of ITU-T SG16 WP3 and ISO/IEC JTC1/SC29/WG11) 5. Geneva Switzerland, Mar. 16-23, 2011, No. JCTVC-E335.

Wiegand et al., "WD3: Working Draft 3 of High-Efficiency Video Coding", JCT-VC (Joint Collaborative Team on Video Coding of ITU-T SG16 WP3 and ISO/IEC JTC1/SC29/WG11) 5. Geneva Switzerland, Mar. 16-23, 2011, No. JCTVC-E603.

* cited by examiner

METHOD OF DECODING MOVING PICTURE

CROSS-REFERENCE TO RELATED APPLICATIONS

This application is a continuation application of U.S. application Ser. No. 13/624,814 filed on Sep. 21, 2012, which is a continuation application of International Application No. PCT/KR2011/009562 filed on Dec. 13, 2011, which claims priority to Korean Application No. 10-2010-0127663 filed on Dec. 14, 2010 and Korean Application No. 10-2011-0064312 filed Jun. 30, 2011. The applications are incorporated herein by reference.

TECHNICAL FIELD

The present invention relates to a method of decoding a moving picture in inter prediction mode, and more particularly, to a method of decoding a motion vector of a current prediction unit using one of motion vectors of spatially and temporally neighboring prediction unit.

BACKGROUND ART

In image compression methods such as Motion Picture Experts Group (MPEG)-1, MPEG-2, MPEG-4 and H.264/MPEG-4 Advanced Video Coding (AVC), one picture is divided into macroblocks to encode an image. Then, the respective macroblocks are encoded using inter prediction or intra prediction.

In inter prediction, a motion estimation is used to eliminate temporal redundancy between consecutive pictures. To detect the temporal redundancy, one or more reference pictures are used to estimate motion of a current block, and a motion compensation is performed to generate a prediction block using motion information. A block very similar to an original block is searched in a predetermined range of the reference picture. If a block similar to an original block is searched, a residual block between the original block and the prediction block and motion information are transmitted to enhance the coding efficiency.

A motion vector indicating difference between the current block and the similar block of the reference picture is needed to correctly decode the inter-coding block. Thus, the motion information should be inserted in a bit stream.

If the motion information is inserted in the bit stream without encoding, the coding efficiency decreases. Therefore, a motion vector predictor is generated using motion vectors of neighboring block, and the difference between the motion vector and the motion vector predictor is encoded to reduce the amount of coding bits required to encode the motion vector.

In H.264, the motion vector predictor is determined as a median of a left motion vector, an above motion vector and an above left motion vector. But, if a motion of the current block is different motions of the neighboring blocks, the coding efficiency of the motion vector degrades. Accordingly, a new method of encoding a motion vector is required when the motion of image is little or steady or the image to be encoded is a background image.

SUMMARY OF THE DISCLOSURE

The present invention is directed to a method of decoding a motion vector of a current prediction unit using one of motion vectors of spatially and temporally neighboring prediction unit.

One aspect of the present invention provides a method of decoding a moving picture in intra prediction mode, comprising: a step of generating a prediction block of a current prediction unit; and a step of generating a residual block of the current prediction unit. The step of generating the prediction block of the current prediction unit includes the steps of: obtaining a reference picture index and motion vector difference of the current prediction unit from a received bit stream; constructing a motion vector candidate list using available spatial and temporal motion vector candidates; determining a motion vector candidate indicated by a motion vector index as a motion vector predictor and restoring a motion vector of the current prediction unit using the motion vector difference and the motion vector predictor; and generating a prediction block of the current prediction unit using the restored motion vector and the reference picture index. The temporal motion vector candidate is a first available motion vector encountered when retrieving two blocks corresponding to the current prediction unit or a motion vector of a predetermined block. The step of generating the residual block of the current prediction unit includes the step of: entropy-decoding residual signals; inversely scanning the residual signals using a first scan pattern; restoring a transform block by inversely quantizing a quantized transform block; and inversely transforming the transform block. When a size of the transform block is larger than a first reference size, the residual signals are inversely scanned in a unit of subset and a scan pattern for scanning a plurality of subsets is the same with a scan pattern for scanning residual signals of each subset.

The step of generating the prediction block of the current prediction unit may include: restoring a reference picture index and a differential motion vector of the current prediction unit from a received bit stream; constructing a motion vector candidate list using available spatial and temporal motion vector candidates; and determining a motion vector candidate indicated by a motion vector index as a motion vector predictor and restoring a motion vector of the current prediction unit using the differential motion vector and the motion vector predictor.

When the current prediction unit is located at a below border of a current maximum coding unit, the temporal motion vector candidate may be a motion vector of a center block including an above-left pixel or a below-left pixel of center position of a block corresponding to the current prediction unit within a temporal motion vector candidate picture.

When a left spatial motion vector of the current prediction unit is scaled, an above spatial motion vector of the current prediction unit to be scaled is set to unavailable.

A method according to the present invention derives spatial motion vector candidates using valid motion vectors of neighboring prediction units each of which exists at a predetermined position, derives temporal motion vector candidate of the current prediction unit and determines one of the spatial and temporal motions vector candidates as a motion vector predictor. Therefore, complexity of the decoder is reduced and the motion information is effectively encoded and decoded.

DETAILED DESCRIPTION OF THE DISCLOSURE

Hereinafter, various embodiments of the present invention will be described in detail with reference to the accompanying drawings. However, the present invention is not limited to the exemplary embodiments disclosed below, but can be implemented in various types. Therefore, many other modifications and variations of the present invention are possible, and it is to be understood that within the scope of the disclosed concept, the present invention may be practiced otherwise than as has been specifically described.

A picture is divided into a plurality of slices, and each slice is divided into a plurality of largest coding units (LCUs). The position of each LCU is designated by an address indicator. The LCU may be a coding unit or may be divided into a plurality of coding units. The LCU contains information indicating structure of coding units in the LCU. One or more split flags are used to indicate the structure of coding units in the LCU.

Each coding units consists of one or more prediction units. The prediction unit is used for intra prediction and inter prediction. A transform unit is used for transform coding. In intra prediction, the prediction unit contains one or more transform units. In inter prediction, a transform unit may be comprised of one or more prediction units. The maximum size of the prediction unit is defined in a sequence parameter set (SPS), and the transform unit has a form of a recursive quad tree. The maximum size of the prediction unit in intra prediction may be different from that of the prediction unit in inter prediction. The maximum sizes of the prediction unit in intra prediction and inter prediction are contained the sequence parameter set.

A prediction unit structure of a coding unit for luminance component is the same as that for chrominance components. But, a transform unit structure of a coding unit for luminance component may be different from that for chrominance components. That is, the transform unit size of the chrominance component may be determined regardless of the transform unit size of the luminance component. For example, the transform unit size of the chrominance component may be determined by the size of the coding unit. The transform unit size of the chrominance component may be adaptively adjusted by determining the maximum depth information of the chrominance component in advance. For example, if the depth information of the luminance component is equal to or smaller than the depth information of the chrominance component, the transform unit structure of the chrominance is set as the same as that of the luminance component.

A procedure of scanning coding unit for decoding is as follows.

First, an address of a largest coding unit (LCU) is parsed. A LCU size is also parsed. The LCU size may be a predetermined value between an encoder and a decoder, or may be inserted into a sequence header or a picture header of a bit stream. A position of an upper left pixel of the LCU is obtained using the address and/or size of the LCU.

Figure 1:
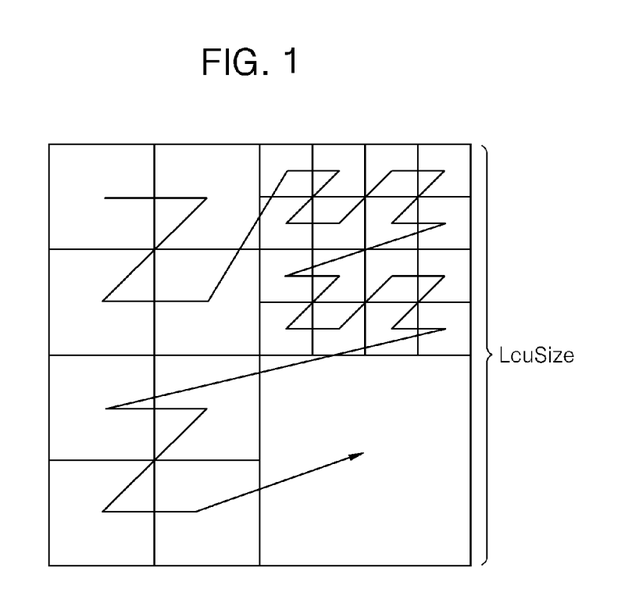
FIG. 1 is a conceptual diagram illustrating a method of scanning coding units in a largest coding unit according to the present invention.

FIG. 1 is a conceptual diagram illustrating a method of scanning coding units in a largest coding unit according to the present invention. As shown in FIG. 1, the coding units in the LCU are scanned recursively in raster order.

If there are a plurality of prediction units in a coding unit, the prediction units are also scanned in raster order. The position of the prediction unit is specified by prediction unit index. Therefore the upper left pixel of the prediction unit is obtained using the prediction unit index. If there are a plurality of transform units in a coding unit, the prediction units are also scanned recursively in raster order. The upper left pixel of the transform unit is obtained using the transform unit index.

A sequence parameter set is transmitted through sequence header. The sequence parameter set includes a smallest size of coding unit and maximum split depth information. The sequence parameter set also includes a smallest size of transform unit and maximum transform depth information. The transform depth information may be different in intra prediction and in inter prediction.

A slice header includes a slice type. If the slice type is P or B, information indicating a method used to generate a prediction block is included. The slice header may include a flag indicating whether a temporal candidate is used or not when encoding motion information. The temporal candidate is a motion vector of the prediction unit which exists at a position or nearby the position corresponding to the position of the current prediction unit. When there exists a plurality of prediction units in the reference picture, one motion vector is selected as a temporal motion vector according to a predetermined method. The position of the candidate may be changed according to a position of the current prediction unit in LCU. The slice header may include a flag indicating a reference picture list that a temporal candidate picture belongs to. If there is not the flag indicating a reference picture list, a value of the flag is considered 1 (that, the reference picture list 0). The slice header includes information for managing memory to store reference pictures.

The slice header includes a flag indicating whether adaptive loop filtering is applied to the current slice. If the adaptive loop filtering is applied, the slice header further includes adaptive loop filter (ALF) parameter information. The ALF parameter information includes information indicating a horizontal filter length and/or a vertical filter length of luminance components. The ALF parameter information may include information indicating the number of filters. If the number of filters is 2 or more, the coefficients of the filter may be encoded using prediction method.

Chrominance components may also be filtered adaptively. The ALF parameter information may include information whether each chrominance component is filtered or not. To reduce the amount of bits, the information indicating whether the Cr component is filtered and information indicating whether the Cb component is filtered may be coded jointly. A lowest index is assigned to the case that none of Cr and Cb components are not filtered because the probability that none of Cr and Cb components is not filtered is high. A highest index is assigned to the case that the both of Cr and Cb components are filtered.

The ALF parameter may be transmitted in a picture header or another parameter set. In this case, the slice header does not include the ALF parameter.

The adaptive loop filter process may be performed on the basis of coding unit or on the basis of coding unit equal to or larger than a predetermined size. And the slice header may include information indicating whether the adaptive loop filter process is applied to each coding unit.

A slice includes a slice header and a plurality of LCUs. The LCU includes information indicating the LCU structure. The LCU has a recursive quad tree structure. The structure is defined by split_coding_unit_flag. A coding unit of minimum size does not contain the split_coding_unit_flag. A coding unit may include an alf_flag indicating whether the adaptive loop filter is applied or not.

In H.264, a median value of motion vector of left neighboring block, an above neighboring block and an above right neighboring block.

But, in HEVC, because a prediction unit of adaptive size is used for motion compensation, there is a high possibility that the size of the current prediction unit is different from that of neighboring prediction unit. Therefore, the motion vector is predicted as follows.

A left motion vector and an above motion vector are used as spatial motion vector candidates. The left motion vector is a motion vector of one of a plurality of left neighboring prediction units and the above motion vector is a motion vector of one of a plurality of above neighboring prediction units. For example, the left motion vector is a valid motion vector encountered first when retrieving the plurality of left neighboring prediction units in a first predetermined order, and the above motion vector is a valid motion vector encountered first when retrieving the plurality of above neighboring prediction units in a second predetermined order. If a current prediction unit is located at the upper boundary of a picture or a slice, only the left motion vector is used as the spatial motion vector candidate. Also, if the current prediction unit is located at the left boundary of a picture or slice, only the above motion vector is used as the spatial motion vector candidate.

A motion vector of a temporal block is used as a temporal motion vector candidate. The temporal block exists at or nearby a position of a temporal candidate picture corresponding to a position of the current prediction unit. A plurality of blocks may exist at or nearby the position of a temporal reference picture candidate. Thus, the temporal block may be a block determined by a position of the current prediction unit, or may be one of a plurality of blocks. The temporal block may be determined depending on a position of the current prediction unit in a LCU. In B slice, it is determined whether the temporal candidate picture containing the temporal motion vector candidate belongs to a reference picture list 0 or 1. A list indicator indicating one reference picture list is inserted in a slice header and transmitted to a decoder. If a slice header does not contain the list indicator, the list indicator is considered as 1 (that is, indicating reference picture list 0).

A procedure of encoding a motion vector of a current prediction unit is as follows.

First, a motion vector of the current prediction unit is obtained.

Next, an available left motion vector candidate and an available above motion vector candidate are derived. If the motion vector of neighboring prediction unit does not exist or the neighboring prediction unit is not included current slice, the motion vector is determined as unavailable.

Next, the spatial motion vector may be scaled adaptively. If the current prediction unit and the neighboring prediction unit have same reference picture, the motion vector candidate is not scaled. But, if the current prediction unit and the neighboring prediction unit have different reference pictures, or the temporal distances of the reference picture are not same, the motion vector candidate may be scaled using the temporal distances. The motion vector may not be scaled for a still image or background image. The number of scaling of the spatial motion vector candidate may be limited to a predetermined number. For example, the number of scaling may be 1. In this case, if scaling is performed once, the second spatial motion vector candidate to be scaled is set as unavailable.

Next, an available temporal motion vector candidate is derived. The temporal motion vector candidate is the same as mentioned above.

Next, a candidate list is constructed using the available spatial and temporal motion vector candidates. The spatial motion vector candidates are the left and above motion vector candidates. The available temporal motion vector candidate is listed after the valid spatial motion vectors. If a plurality of motion vector candidates are the same, motion vector candidate of lower priority is deleted from the candidate list.

Next, a motion vector predictor is selected among the motion vector candidates listed on the candidate list. The number of motion vector candidate may be predetermined. If the number of available motion vector candidates is larger than the predetermined number, the motion vector predictor is selected among the predetermined number of motion vector candidates. If the number of available motion vector candidates is smaller than the predetermined number, one or more additional motion vector candidates may be added. The additional motion vector candidate is a zero vector.

Next, a motion vector difference is obtained and encoded. Information indicating motion vector predictor is also encoded. The motion vector difference is a difference between the motion vector of the current prediction unit and the motion vector predictor.

A procedure of decoding a motion vector of a current prediction unit is as follows.

A motion vector difference of the current prediction unit is decoded.

A motion vector index indicating a motion vector predictor of the current prediction unit is restored.

A motion vector predictor is determined through the following procedure.

First, an available left motion vector candidate and an available above motion vector candidate are derived. If the motion vector of neighboring prediction unit does not exist or the neighboring prediction unit is not included current slice, the motion vector is determined as unavailable.

Next, the spatial motion vector may be scaled adaptively. If the current prediction unit and the neighboring prediction unit have same reference picture, the motion vector candidate is not scaled. But, if the current prediction unit and the neighboring prediction unit have different reference pictures, or the temporal distances of the reference picture are not same, the motion vector candidate may be scaled using the temporal distances. The motion vector may not be scaled for a still image or background image. The number of scaling of the spatial motion vector candidate may be limited to a predetermined number. For example, the number of scaling may be 1. In this case, if scaling is performed once, the second spatial motion vector candidate to be scaled is set as unavailable.

Next, an available temporal motion vector candidate is derived. The temporal motion vector candidate is the same as mentioned above.

Next, a candidate list is constructed using the available spatial and temporal motion vector candidates. The spatial motion vector candidates are the left and above motion vector candidates. The available temporal motion vector candidate is listed after the valid spatial motion vectors. If a plurality of motion vector candidates are the same, motion vector candidate of lower priority is deleted from the candidate list.

Next, a motion vector predictor is selected among the available motion vector candidates listed on the candidate list. The number of motion vector candidate may be predetermined. If the number of available motion vector candidates is larger than the predetermined number, the motion vector predictor is selected among the predetermined number of motion vector candidates. If the number of available motion vector candidates is smaller than the predetermined number, one or more additional motion vector candidates may be added. The additional motion vector candidate is a zero vector.

When the motion vector candidates of the current prediction unit are derived, one motion vector candidate indicated by the motion vector index is determined as the motion vector predictor.

A motion vector of the current prediction unit is obtained using the motion vector difference and the motion vector predictor.

A reference picture index of the temporal candidate picture may be 0.

Figure 2:
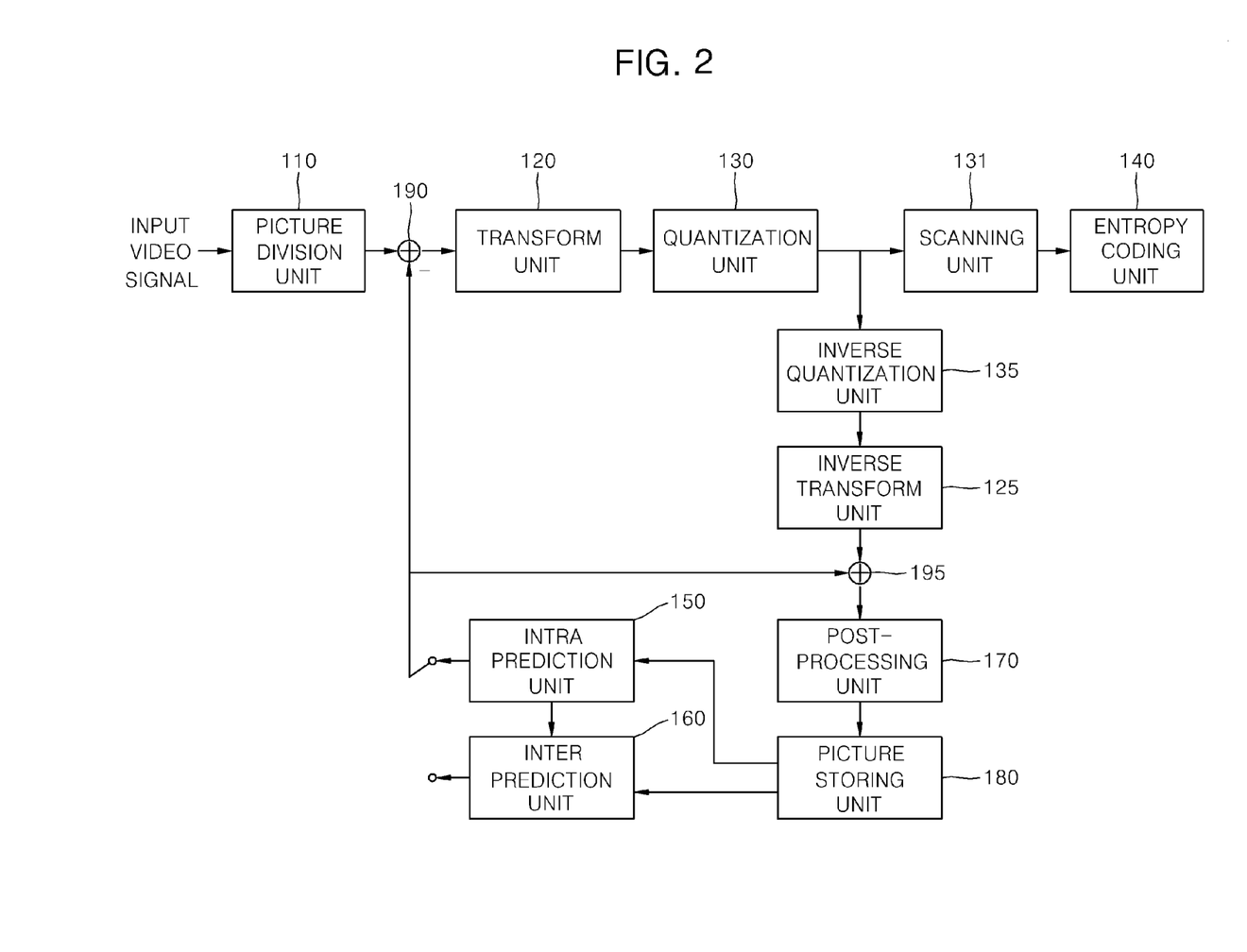
FIG. 2 is a block diagram of a moving picture coding apparatus according to the present invention.

FIG. 2 is a block diagram of a moving picture coding apparatus according to the present invention.

Referring to FIG. 2, a moving picture coding apparatus 100 according to the present invention includes a picture division unit 110, a transform unit 120, a quantization unit 130, a scanning unit 131, an entropy coding unit 140, an intra prediction unit 150, an inter prediction unit 160, an inverse quantization unit 135, an inverse transform unit 125, a post-processing unit 170, a picture storing unit 180, a subtractor 190 and an adder 195.

The picture division unit 110 analyzes an input video signal to divide each LCU of a picture into one or more coding units each of which has a predetermined size, determine prediction mode of each coding unit, and determines size of prediction unit per each coding unit. The picture division unit 110 sends the prediction unit to be encoded to the intra prediction unit 150 or the inter prediction unit 160 according to the prediction mode. Also, the picture division unit 110 sends the prediction units to be encoded to the subtractor 190.

The transform unit 120 transforms residual signals between an original block and a prediction block generated by the intra prediction unit 150 or the inter prediction unit 160. A size of a transform unit is equal to or smaller than a size of coding unit. In intra prediction, the size of the transform unit is equal to or smaller than a size of prediction unit. In inter prediction, the size of the transform unit may be larger than the size of prediction unit. A transform matrix type may be adaptively determined according to a prediction mode and an intra prediction mode. The transform unit may be transformed by horizontal and vertical one-dimensional (1D) transform matrices.

If the prediction mode is an inter prediction, one predetermined transform matrix type is applied.

If the prediction mode is intra and the size of the transform unit is equal to or smaller than a predetermined size, the vertical and horizontal transform matrices are adaptively determined. For example, if the intra prediction mode is horizontal, there is a high possibility that the residual signals will have vertical directivity. Thus, a discrete cosine transform (DCT)-based integer matrix is applied to the vertical direction, and a discrete sine transform (DST) or Karhunen Loève transform (KLT)-based integer matrix is applied to the horizontal direction. If the intra prediction mode is vertical, a DST or KLT-based integer matrix is applied to the vertical direction, and a DCT-based integer matrix is applied to the horizontal direction. Also, in DC mode, a DCT-based integer matrix is applied to the horizontal and vertical directions. That is, in intra prediction of luminance component, the transform matrix may be adaptively determined according to a size of the transform unit and the intra prediction mode. On the other hand, in intra prediction mode of chrominance component, the transform matrix is a predetermined matrix regardless of the prediction mode and the intra prediction mode.

Meanwhile, a transform pattern may be adaptively selected per transform unit among a plurality of transform patterns, and the transform pattern may be transmitted to a decoder. One of the plurality of transform patterns includes a pattern where no transform is applied. The plurality of transform patterns may include a two-dimensional transform, a vertical transform and a horizontal transform. A scan pattern of the scanning unit 131 may be determined by the transform pattern. For example, a first scan pattern (diagonal scan) is selected if the transform pattern is the two-dimensional transform, a second scan pattern (horizontal scan) is selected if the transform pattern is the vertical transform, a third scan pattern (vertical scan) is selected if the transform pattern is the horizontal transform, and the first scan pattern is selected if the transform pattern is the pattern where no transform is applied.

The quantization unit 130 determines a quantization step size for quantizing transform coefficients of the residual block. The quantization step size is determined per a coding unit having a size equal to or larger than a predetermined size. If a plurality of coding units are included in the predetermined size, the quantization step size is determined on the predetermined size. Using the determined quantization step size and a quantization matrix determined according to a prediction mode, the transform coefficients are quantized. When the size of the current coding unit is equal to or larger than the predetermined size, the quantization unit 130 may determine a quantization step size predictor of the current coding unit using quantization step sizes of neighboring coding units or a quantization step size of a previous coding unit in scan order.

For example, the quantization unit 130 may determine a quantization step size of a left coding unit, a quantization step size of a above coding unit or average of the quantization step sizes of the left and above coding units as a quantization step size predictor according to an intra prediction mode. If the above coding unit does not exist, the quantization step size of the left coding unit or the previous coding unit may be determined as the quantization step size predictor. If the left coding unit is unavailable, the quantization step size of the above coding unit or the previous coding unit may be determined as the quantization step size predictor. When the average of the quantization step sizes of the left and the above coding units is used, if only one quantization step size is available, the available one or the quantization step size of the previous coding unit may be determined as the quantization step size predictor. In inter prediction, the quantization step size predictor is the average of the quantization step sizes of the left and the above coding units or the quantization step size of the previous coding unit.

The quantized transform block is provided to the inverse quantization unit 135 and the scanning unit 131.

The scanning unit 131 scans the quantized transform coefficients of the quantized transform block or significant map information indicating whether each of the quantized transform coefficients is zero or not. A scan pattern is determined according to the intra prediction mode and the prediction mode. The scan pattern may also be determined according to the size of the transform unit.

The scanning unit 131 determines the quantized transform block into a plurality of subsets. If the size of the transform unit is larger than a first reference size, the quantized transform block is divided into the plurality of subsets. The first reference size is 4×4 or 8×8.

The scanning unit 131 determines a scan pattern. In inter prediction, a first scan pattern (for example, zigzag scan or diagonal scan) is used. In intra prediction, the scan pattern is selected based on the intra prediction mode and the size of the transform unit. The first scan pattern is used for non-directional intra prediction modes. The non-directional intra prediction modes are a DC mode and a planar mode. The scan is performed in a forward direction or in a reverse direction. When the quantized transform block is divided into a plurality of subsets, same scan pattern is applied to all the subsets. The plurality of subsets consist of one main subset and one or more residual subsets. The main subset is located at an upper left side and includes a DC coefficient. The one or more residual subsets cover region other than the main subset.

The first scan pattern may be applied to inversely scan the subsets. The subsets may be scanned beginning with the main subset to the residual subsets in a forward direction, or can be scanned in a reverse direction. A scan pattern for scanning the subsets may be set the same as a scan pattern for scanning the quantized transform coefficients.

An encoder transmits information capable of indicating a position of the last non-zero quantized coefficient of the transform unit to a decoder. The encoder also transmits information capable of indicating a position of the last non-zero quantized coefficient of each subset to the decoder or information indicating whether each subset includes non-zero coefficient or not.

The inverse quantization unit 135 inversely quantizes the quantized transform coefficients. The inverse transform unit 125 restores residual signals of the spatial domain from the inversely quantized transform coefficients. The adder 195 generates a reconstructed block by adding the residual block reconstructed by the inverse transform unit 125 and the prediction block from the intra prediction unit 150 or the inter prediction unit 160.

The post-processing unit 170 performs a deblocking filtering process for removing a blocking artifact generated in a reconstructed picture, an adaptive offset application process for complementing a difference between the reconstructed picture and the original image per pixel, and an adaptive loop filter process for complementing a difference between the reconstructed picture and the original image in a coding unit.

The deblocking filtering process may be applied to a boundary between prediction units having a predetermined size or more and between transform units. The predetermined size may be 8×8. The deblocking filtering process includes a step of determining a boundary to be filtered, a step of determining boundary filtering strength to be applied to the boundary, a step of determining whether or not to apply a deblocking filter, and a step of selecting a filter to be applied to the boundary when it is determined to apply the deblocking filter.

Whether or not to apply the deblocking filter is determined according to i) whether or not the boundary filtering strength is greater than 0 and ii) whether or not a value indicating the difference between boundary pixels of P block and Q block is smaller than a first reference value determined according to a quantization parameter.

Two or more filters may exist. When an absolute value of a difference between two pixels adjacent to the block boundary is equal to or larger than a second reference value, a weak filter is selected. The second reference value is determined by the quantization parameter and the boundary filtering strength.

The adaptive offset application process is intended to reduce a difference (distortion) between a pixel subjected to the deblocking filter and the original pixel. A picture or slice may be divided into a plurality of offset regions, and an offset mode may be determined per the offset region. There are four edge offset modes, two band offset modes and an offset non-application mode. According to each offset mode, pixels in each offset region are classified into a predetermined number of classes, and offset corresponding to the classified class is added to the pixel. In the case of an edge offset mode, a class of a current pixel is determined by comparing the current pixel value with pixel values of two or more pixels adjacent to the current pixel.

The picture storing unit 180 receives post-processed image from the post-processing unit 170, and stores the image in picture units. A picture may be a frame or a field. The picture storing unit 180 has a buffer (not shown) capable of storing a plurality of pictures.

The inter prediction unit 160 performs motion estimation using one or more reference pictures stored in the picture storing unit 180, and determines one or more reference picture indices indicating the reference pictures and one or more motion vectors. According to the reference picture index and motion vector, the inter prediction unit 160 extracts a prediction block corresponding to a prediction unit to be encoded from a reference picture selected among a plurality of reference pictures stored in the picture storing unit 180 and outputs the extracted prediction block.

The intra prediction unit 150 performs intra prediction using reconstructed reference pixels in a picture including a current prediction unit. The intra prediction unit 150 receives the current prediction unit to be predictively encoded, selects one of a predetermined number of intra prediction modes, and performs intra prediction. The predetermined number of intra prediction modes depends on a size of the current prediction unit. The intra prediction unit 150 adaptively filters reference pixels to generate an intra prediction block. When some of reference pixels are not available, it is possible to generate the reference pixels at the invalid positions using valid reference pixels.

The entropy coding unit 140 entropy-codes the quantized transform coefficients from the quantization unit 130, intra prediction information received from the intra prediction unit 150, motion information received from the inter prediction unit 160, and so on.

Figure 3:
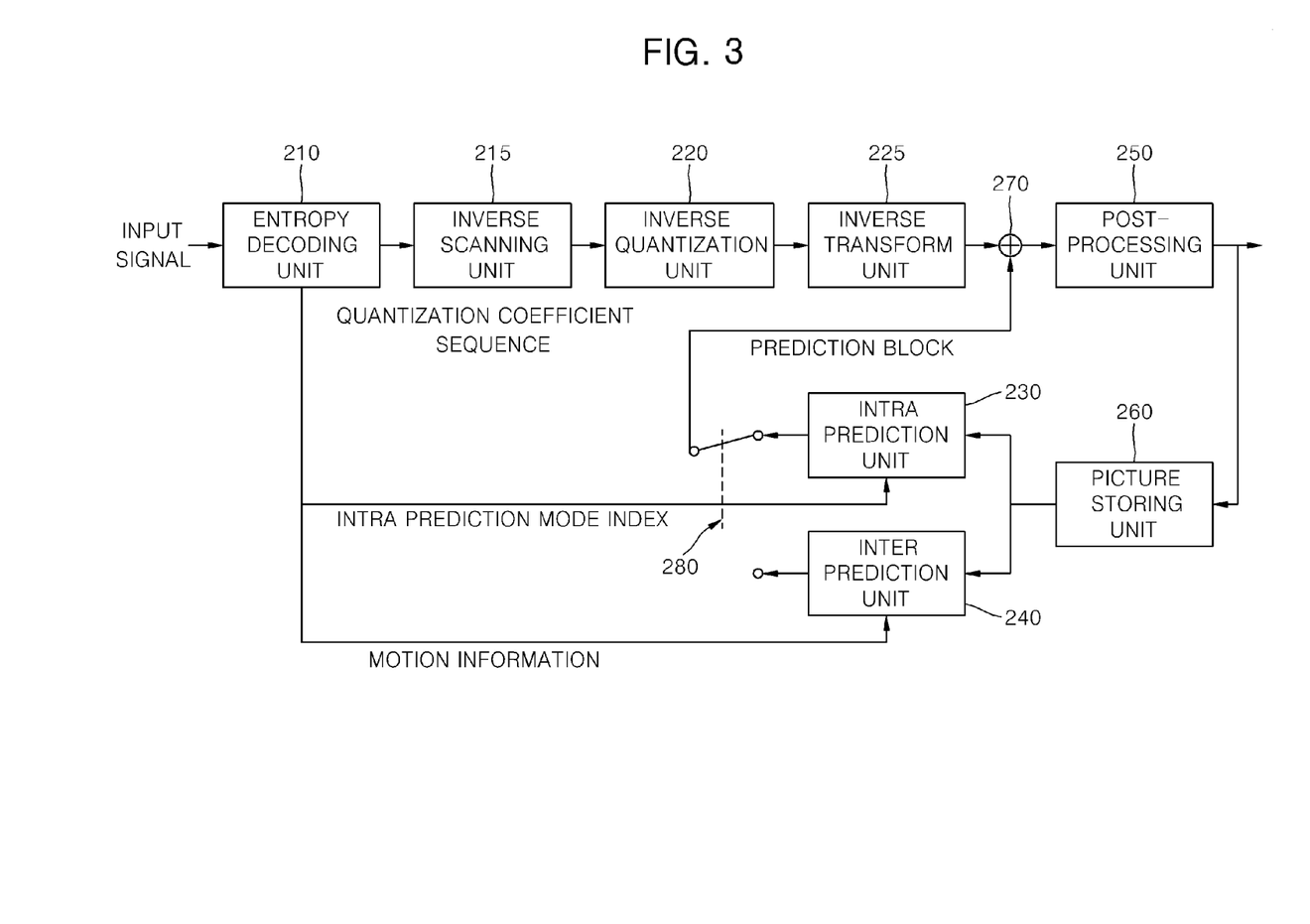
FIG. 3 is a block diagram of a moving picture decoding apparatus according to the present invention.

FIG. 3 is a block diagram of a moving picture decoding apparatus according to the present invention.

The moving picture decoding apparatus according to the present invention includes an entropy decoding unit 210, an inverse quantization/transform unit 220, an adder 270, a post-processing unit 250, a picture storing unit 260, an intra prediction unit 230, an inter prediction unit 240 and a switch 280.

The entropy decoding unit 210 extracts an intra prediction mode index, inter prediction information and a quantized coefficient sequence from a received bit stream. The entropy decoding unit 210 transmits the inter prediction information to the inter prediction unit 240, the intra prediction mode index to the intra prediction unit 230 and the inverse quantization/transform unit 220, and the quantized coefficient sequence to the inverse quantization/transform unit 220.

The inverse quantization/transform unit 220 comprises an inverse scanning unit 221, inverse quantization unit 222 and inverse transform unit 223.

The inverse scanning unit 221 converts the quantized coefficients information into a two dimensional quantized transform block. One of a plurality of inverse scan patterns is selected for the conversion. The inverse scan pattern is selected based on at least one of the prediction mode and the intra prediction mode.

For example, in inter prediction, a first scan pattern (for example, zigzag scan or diagonal scan) is used. In intra prediction, the scan pattern is selected based on the intra prediction mode. The first scan pattern is used for non-directional intra prediction modes. The non-directional intra prediction modes are a DC mode and a planar mode.

If the size of the current transform unit is larger than a first reference size, the quantized transform block is divided into a plurality of subsets. When the quantized transform block is divided into a plurality of subsets, the quantized transform coefficients of each subset are inversely scanned to generate quantized transform block. Same scan pattern is applied to all the subsets. The plurality of subsets consist of one main subset and one or more residual subsets. The main subset is located at an upper left side and includes a DC coefficient. The one or more residual subsets cover region other than the main subset.

The first scan pattern may be applied to inversely scan the subsets. The subsets may be scanned beginning with the main subset to the residual subsets in a forward direction, or can be scanned in a reverse direction. A scan pattern for scanning the subsets may be set the same as a scan pattern for scanning the quantized transform coefficients. Thus, the scan pattern for inversely scanning the subsets is selected according to the intra prediction mode.

When the quantized transform block is divided into a plurality of subsets, the quantized transform coefficients are inversely scanned using decoded information indicating whether each subset includes non-zero coefficient or not. For example, the scan pattern is applied to each subset including at least one non-zero coefficient.

The inverse quantization unit 222 generates a quantization step size predictor of a current coding unit. The quantization step size is determined on a coding unit having a size equal to or larger than a predetermined size. If a plurality of coding units are included in the predetermined size, the quantization step size is determined on the predetermined size. The inverse quantization unit 222 may determine a quantization step size predictor using one or more quantization step sizes of neighboring coding unit or a quantization step size of the previous coding unit in scan order.

For example, the inverse quantization unit 222 may determine one of quantization step sizes of a left coding unit and an above coding unit or average of the quantization step sizes of the left and above coding units as a quantization step size predictor. If the above coding unit does not exist, the quantization step size of the left coding unit or the previous coding unit may be determined as the quantization step size predictor. If the left coding unit is unavailable, the quantization step size of the above coding unit or the previous coding unit may be determined as the quantization step size predictor. When the average of the quantization step sizes of the left and the above coding units is used, if only one quantization step size is available, the available one or the quantization step size of the previous coding unit may be determined as the quantization step size predictor. In inter prediction, the quantization step size predictor is the average of the quantization step sizes of the left and the above coding units or the quantization step size of the previous coding unit.

When the quantization step size predictor is determined, a quantization step size of the current coding unit is generated by adding the received residual quantization step size and the quantization step size predictor. Then, the quantized transform coefficients are inversely quantized using an inverse quantization matrix determined by the quantization step size and the prediction mode.

The inverse transform unit 230 determines an inverse transform matrix according to the size of the transform unit if the inverse quantized block is a luminance block and the prediction mode is intra. For example, if the size of the transform unit is equal to or smaller than a predetermined size, the vertical and horizontal one-dimensional inverse transform matrix is determined according to the intra prediction mode. For example, if the intra prediction mode is horizontal, there is a high possibility that the residual signals will have vertical directivity. Thus, a DCT-based integer matrix is applied to the vertical direction, and a DST or KLT-based integer matrix is applied to the horizontal direction. If the intra prediction mode is vertical, a DST or KLT-based integer matrix is applied to the vertical direction, and a DCT-based integer matrix is applied to the horizontal direction. Also, in DC mode, a DCT-based integer matrix is applied to the horizontal and vertical directions. That is, in intra prediction of luminance component, the inverse transform matrix may be adaptively determined according to the size of the transform unit and the intra prediction mode. On the other hand, in intra prediction mode of chrominance component, the inverse transform matrix is a predetermined matrix regardless of the prediction mode and the intra prediction mode.

The adder 270 adds the restored residual block and a prediction block generated by the intra prediction unit 230 or the inter prediction unit 240 to generate a reconstructed block.

The post-processing unit 250 performs a deblocking filtering process for removing blocking artifact generated in a reconstructed picture, an adaptive offset application process for complementing a difference between the reconstructed picture and the original image per pixel, and an adaptive loop filter process for complementing a difference between the reconstructed picture and the original image in a coding unit.

The deblocking filtering process may be applied to a boundary between prediction units having a predetermined size or more and between transform units. The predetermined size may be 8×8. The deblocking filtering process includes a step of determining a boundary to be filtered, a step of determining boundary filtering strength to be applied to the boundary, a step of determining whether or not to apply a deblocking filter, and a step of selecting a filter to be applied to the boundary when it is determined to apply the deblocking filter.

Whether or not to apply the deblocking filter is determined according to i) whether or not the boundary filtering strength is greater than 0 and ii) whether or not a value indicating the difference between boundary pixels of P block and Q block is smaller than a first reference value determined according to a quantization parameter.

Two or more filters may exist. When an absolute value of a difference between two pixels adjacent to the block boundary is equal to or larger than a second reference value, a weak filter is selected. The second reference value is determined by the quantization parameter and the boundary filtering strength.

The adaptive offset application process is intended to reduce a difference (distortion) between a pixel subjected to the deblocking filter and the original pixel. A picture or slice may be divided into a plurality of offset regions, and an offset mode may be determined per the offset region. There are four edge offset modes, two band offset modes and an offset non-application mode. According to each offset mode, pixels in each offset region are classified into a predetermined number of classes, and offset corresponding to the classified class is added to the pixel. In the case of an edge offset mode, a class of a current pixel is determined by comparing the current pixel value with pixel values of two or more pixels adjacent to the current pixel.

The picture storing unit 260 stores a reconstructed picture filtered by the post-processing unit 250.

The intra prediction unit 230 restores the intra prediction mode of the current block based on the received intra prediction information, and generates a prediction block according to the restored intra prediction mode.

The switch 280 transmits a prediction unit generated the intra prediction unit 230 or the inter prediction unit 240 to the adder 270 according to the prediction mode.

The inter prediction unit 240 restores reference picture indexes and motion vectors based on the received inter prediction information, and generates a prediction block using the reference picture indexes and the motion vectors. When the motion vector does not indicate a pixel position, the prediction block is generated using an interpolation filter. The inter prediction unit 240 decodes a motion vector as follows.

Now, a method of decoding a moving image in inter prediction mode is described. The method comprises a procedure of generating a prediction block of the current prediction unit, a procedure of restoring a residual block and a procedure of generating a reconstructed block using the prediction block and the residual block. The procedure of generating a prediction block is performed by the inter prediction unit 240 of FIG. 3.

The procedure of generating a prediction block is as follows. The procedure comprises a step for deriving motion information of a prediction unit and a step for generating a prediction block of the prediction unit. The motion information includes motion vector, prediction direction and reference picture index.

When the prediction unit is encoded in skip mode, the procedure of generating a prediction block is as follows. If the skip_flag is 1, the prediction unit is a coding unit.

Figure 4:
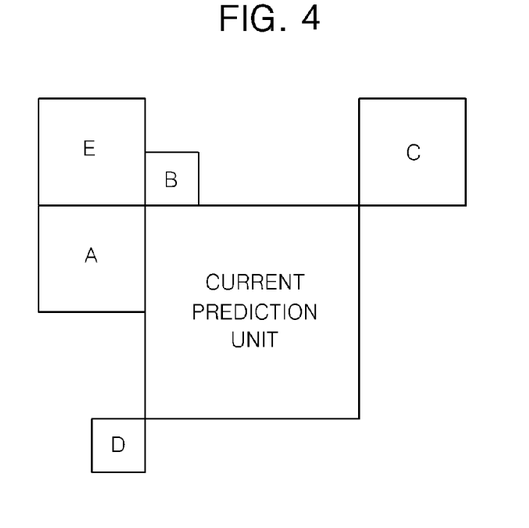
FIG. 4 is a conceptual diagram illustrating positions of spatial skip candidate blocks according to the present invention.

FIG. 4 is a conceptual diagram showing positions of spatial skip candidate blocks according to the present invention. As shown in FIG. 4, a left prediction unit (block A), an above prediction unit (block B), an above right prediction unit (block C) and a left below prediction unit (block D) may be the spatial skip candidates. When there are a plurality of left prediction units, an uppermost left prediction unit or a lowest left prediction unit may be determined as the left prediction unit. When there are a plurality of above prediction units, a leftmost above prediction unit or a rightmost above prediction unit may be determined as the above prediction unit.

First, the availability of each spatial skip candidate blocks is checked. If the prediction unit does not exist or the prediction mode of the prediction unit is intra, the candidate block is determined as unavailable. An above left prediction unit (block E) can be a spatial skip candidate block if one or more of the candidate blocks A, B, C and D are unavailable.

A temporal skip candidate is derived. A reference picture index of the temporal skip candidate is derived and a motion vector of the temporal skip candidate is derived. The reference picture index of temporal skip candidate may be set to 0 or may be derived using reference picture indexes of spatially neighboring prediction units. The neighboring prediction units are predetermined.

The motion vector for the temporal skip candidate is derived as follows.

First, a reference picture which a temporal skip candidate block belongs to (a temporal skip candidate picture) is derived. A reference picture of index 0 may be determined as the temporal skip candidate picture. For example, a first reference picture of the reference picture list 0 is determined as the temporal skip candidate picture when the slice type is P. When the slice type is B, one reference picture list is selected using a flag of slice header indicating the temporal skip candidate picture and a first reference picture of the selected reference picture list is determined as the temporal skip candidate picture.

Alternatively, a reference picture indicated by a reference picture index for temporal skip candidate picture is determined as the temporal skip candidate picture which the temporal skip candidate block belongs to.

Next, a temporal skip candidate block is derived. One of a plurality of blocks corresponding to the current prediction unit is selected as the temporal skip candidate block. The plurality of blocks are included in the temporal skip candidate picture. A priority is assigned to each of the plurality of blocks. A first available block determined based on the priorities is selected as the temporal skip candidate block. If the motion vector is not available, the temporal skip candidate is considered as unavailable.

Figure 5:
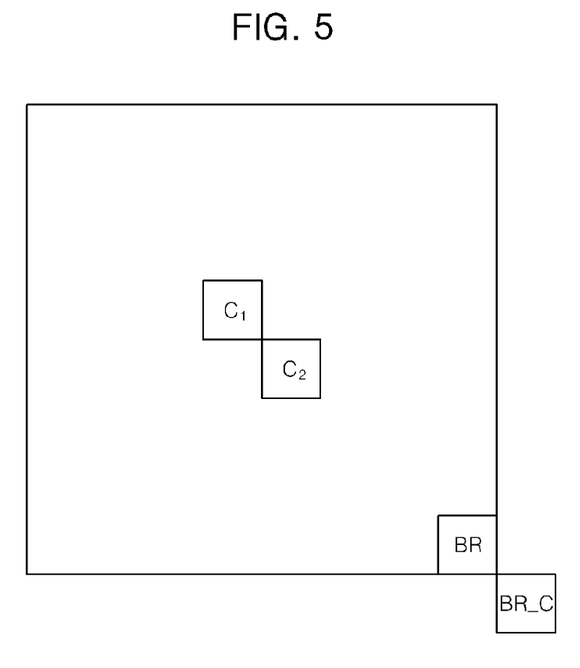
FIG. 5 is a conceptual diagram illustrating positions of blocks in a temporal skip candidate picture corresponding to a current prediction unit according to the present invention.

FIG. 5 is a conceptual diagram illustrating positions of blocks in a temporal skip candidate picture corresponding to a current prediction unit according to the present invention.

In a case of selecting one of the candidate blocks, a below right corner block (block BR0) or a lower right block (block BR1) may be a first skip candidate block and a block (block C) including an upper left pixel or a below left pixel of the center position of a block which is included in the temporal skip candidate picture and corresponds to the current prediction unit may be a second skip candidate block. The below right corner block (block BR0) is adjacent to a block which is included in the temporal skip candidate picture and corresponds to the current prediction unit. The lower right block (block BR1) is located inside of a block which is included in the temporal skip candidate picture and corresponds to the current prediction unit. If the first skip candidate block is available, the first skip candidate block is determined as the temporal skip candidate block. If the first skip candidate block is not available and the second skip candidate block is available, the second skip candidate block is determined as the temporal skip candidate block.

When the prediction unit is located at the lower boundary or right boundary of a picture, the second skip candidate block is determined as the temporal skip candidate block if the second skip candidate block is available. When the prediction unit is located at the lower boundary of a slice or a LCU, the second skip candidate block is determined as the temporal skip candidate block if the second skip candidate block is available.

Next, a skip candidate list is generated.

The skip candidate list is generated using available spatial and temporal skip candidates. The skip candidates may be listed in the order of a spatial left skip candidate (candidate A), a spatial above skip candidate (candidate B), a temporal skip candidate, a spatial above right skip candidate (candidate C) and a spatial below left skip candidate (candidate D), or in a predetermined order determined by the number of skip candidates. For example, the order of temporal skip candidate may be changed according to the number of skip candidates.

For example, if the number of skip candidates is 5, the temporal skip candidate is listed after available spatial skip candidates. If the number of skip candidates is 3, the order of a temporal skip candidate may be adjusted so that the temporal candidate is listed in top 3.

Meanwhile, if the number of the available skip candidates is smaller than a received candidate number from an encoder, one or more skip candidates are generated. The generated skip candidate is listed after the last available skip candidate. When a plurality of skip candidates are generated, the candidates are added in a predetermined order.

The skip candidates are generated using a plurality of methods in a predetermined order. The method used to generate the skip candidate depends on the slice type.

When a current slice type is B and the number of available skip candidates is 2 or more, a first method may be used. When the reference list of the first available skip candidate is different from the reference list of the second available skip candidate, the motion information of the first available skip candidate and the motion information of the first available skip candidate may be combined to generate one or more skip candidates. The generated skip candidate is bi-directional motion information. If the number of the skip candidates generated by the first method may be limited to a predetermined number.

In a second method, a skip candidate having zero motion vector is added. The skip candidate having zero motion vector is one of an uni-directional L0 skip candidate, an uni-directional L1 skip candidate and a bi-directional skip candidate. The uni-directional L0 skip candidate has zero motion vector, reference picture list 0 and reference picture index of 0. The uni-directional L1 skip candidate has zero motion vector, reference picture list 1 and reference picture index of 0. The bi-directional skip candidate is a combination of the uni-directional L0 skip candidate and the uni-directional L1 skip candidate.

When the current slice type is P, the uni-directional L0 skip candidate is added. When the current slice type is B, one or more skip candidates having zero motion vector may be added in the order of the bi-directional L0 skip candidate, the uni-directional L0 skip candidate and the uni-directional L1 skip candidate.

Next, the motion vector and the reference picture index of the current prediction unit are derived.

When there is a skip index in the received prediction unit, the motion vector and the reference picture index of the skip candidate indicated by the skip index are determined as the motion vector and the reference index of the current prediction unit.

When there is not a skip index in the received prediction unit and there exists a skip candidate, the motion vector and the reference picture index of the skip candidate are determined as the motion vector and the reference index of the current prediction unit.

When the skip index indicates the temporal skip candidate, the motion vector of the skip candidate block is determined as the motion vector of the current prediction unit and the reference picture index for the temporal skip candidate is determined as the reference picture index of the current prediction unit.

If the motion vector and the reference picture index are derived, a prediction block is generated using the reference picture index and motion vector. The prediction block is output as a reconstructed block.

When the prediction unit is encoded in merge mode, the procedure of generating a reconstructed block is as follows.

The procedure of generating a reconstructed block in merge mode is almost same as the procedure of generating a reconstructed block in the skip mode.

Valid Spatial merge candidates are derived. The spatial merge candidates are the same as the spatial skip candidates. But, when the current prediction unit is 2N×N, N×2N, 2N×nU, 2N×nD, nL×2N or nR×2N and the current prediction unit is a partition 1, the merge candidate corresponding partition 0 is also deleted.

The temporal merge candidate is the same as the temporal skip candidate.

A procedure of constructing a merge candidate list and a procedure of generating merge candidate are the same as the procedures in the skip mode.

When there is not a merge index in the received prediction unit and there exists a merge candidate, the motion vector and the reference picture index of the merge candidate are determined as the motion vector and the reference index of the current prediction unit. When there is not a merge index in the received prediction unit and there does not exist at least one merge candidate, the motion vector and the reference index of the current prediction unit are set to 0.

If the motion vector and the reference picture index are derived, a prediction block is generated using the reference picture index and motion vector.

Also, a residual block is restored in the unit of transform units. The residual block is restored through entropy decoding, inverse scan, inverse quantization and inverse transform. The procedure is performed by the entropy decoding unit 210, the inverse scanning unit 221, the inverse quantization unit 222 and the inverse transform unit 223 of the decoding apparatus of FIG. 3.

Finally, a reconstructed block is generated using the prediction block and the residual block. The reconstructed block may be generated in the unit of coding units.

When the prediction unit is encoded in motion vector prediction mode, the procedure of generating a reconstructed block is as follows. The procedure is activated when the skip_flag is 0 and the merge_flag is 0.

First, a reference picture index and a motion vector difference of a current prediction unit is obtained from a prediction unit syntax of the received bit stream. If slice type is B, inter prediction information (inter_pred_flag) is checked. If the inter_pred_flag indicates an uni-directional prediction (Pred_LC) using combined reference picture list, a reference picture is selected using the reference picture index among the reference pictures of the combined reference picture list (list_c), and the motion vector difference is restored. If the inter_pred_flag indicates an uni-directional prediction (Pred_L0) using reference picture list 0, a reference picture is selected using the reference picture index among the reference pictures of the reference picture list 0, and the motion vector difference is restored. If the inter_pred_flag indicates an bi-directional prediction (Pred_Bi), each reference picture is selected using each reference picture index among the reference pictures of each reference picture list, and each motion vector difference for each reference picture is restored.

Next, motion vector prediction is determined. The motion vector predictor is selected among spatial motion vector candidates and temporal motion vector candidate.

Figure 6:
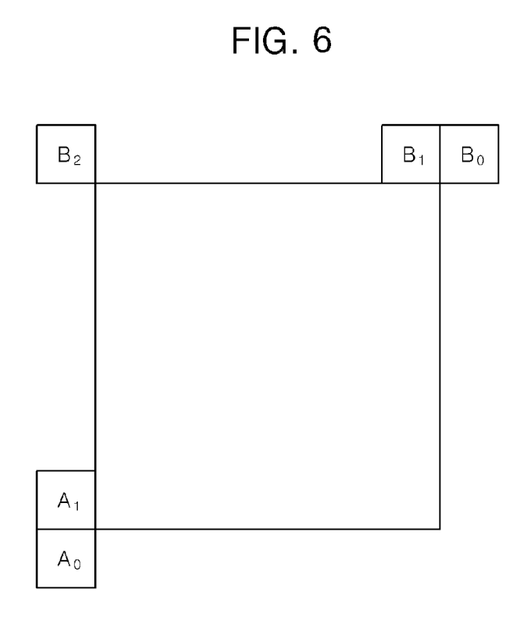
FIG. 6 is a conceptual diagram showing positions of neighboring prediction units used to generate motion vector candidates according to the present invention.

FIG. 6 is a conceptual diagram showing positions of neighboring prediction units used to generate motion vector candidates according to the present invention.

A spatial left motion vector candidate block may be one of left prediction units (blocks $A_0$ and $A_1$) of a current block. A spatial above motion vector candidate block may be one of above prediction units (blocks $B_0$, $B_1$ and $B_2$) of the prediction unit.

A procedure for deriving a spatial left motion vector candidate is as follows.

It is checked whether there is a prediction unit satisfying first conditions or second conditions when retrieving the left blocks in the order of blocks $A_0$ and $A_1$. The first conditions are 1) there exists a prediction unit, 2) the prediction unit is inter-coded, 3) the prediction unit has same reference picture as that of the current prediction unit and 4) the prediction unit has same reference picture list as that of the current prediction unit. If there is a prediction unit satisfying the first conditions, the motion vector of the prediction unit is determined as the spatial left motion vector candidate. The second conditions are 1) there exists a prediction unit, 2) the prediction unit is inter-coded, 3) the prediction unit has same reference picture as that of the current prediction unit and 4) the prediction unit has different reference picture list from that of the current prediction unit. If there is a prediction unit satisfying the second conditions, the motion vector of the prediction unit is determined as the spatial left motion vector candidate.

If there does not exist a prediction unit satisfying any one of the first conditions and the second conditions, it is checked whether there is a prediction unit satisfying third conditions or fourth conditions when retrieving the left blocks in the order of blocks $A_0$ and $A_1$. The third conditions are 1) there exists a prediction unit, 2) the prediction unit is inter-coded, 3) the prediction unit has different reference picture from that of the current prediction unit and 4) the prediction unit has same reference picture list as that of the current prediction unit. If there is a prediction unit satisfying the third conditions, the motion vector of the prediction unit is determined as the spatial left motion vector candidate. The fourth conditions are 1) there exists a prediction unit, 2) the prediction unit is inter-coded, 3) the prediction unit has different reference picture from that of the current prediction unit and 4) the prediction unit has different reference picture list from that of the current prediction unit. If there is a prediction unit satisfying the third conditions, the motion vector of the prediction unit is determined as the spatial left motion vector candidate.

The motion vector of the prediction unit satisfying the first conditions or the second conditions is not scaled. But, the motion vector of the prediction unit satisfying the first conditions or the second conditions is scaled.

If there is not a prediction unit satisfying any one conditions, the spatial left motion vector candidate is unavailable.

A procedure for deriving a spatial above motion vector candidate is as follows.

It is checked whether there is a prediction unit satisfying the first conditions or the second conditions when retrieving the above blocks in the order of blocks $B_0$, $B_1$ and $B_2$. If there is a prediction unit satisfying the first conditions or the second conditions, the motion vector of the prediction unit is determined as the spatial above motion vector candidate.

A temporal motion vector candidate is the same as the motion vector of the temporal skip candidate.

Next, a motion vector candidate list is constructed. The motion vector candidate list is constructed using available spatial and temporal motion vector candidates. The motion vector candidate list may be constructed in a predetermined order. The predetermined order is the order of a spatial left motion vector candidate, a spatial above motion vector candidate and a temporal motion vector candidate, or the order of a temporal motion vector candidate, a spatial left motion vector candidate and a spatial above motion vector candidate.

The predetermined order may be changed or one or more motion vector candidates are excluded from the motion vector candidates according to a prediction mode of the prediction unit.

Next, if a plurality of candidates have same motion vector, the candidate having lower priority is deleted in the motion vector candidate list. If the number of motion vector candidates in the list is smaller than a predetermined number, a zero vector is added.

Next, a motion vector predictor of the current prediction unit is obtained. The motion vector candidate indicated by the motion vector index is determined as the motion vector predictor of the current prediction unit.

Next, a motion vector of the current prediction unit is generated by adding the motion vector difference and the motion vector predictor. And a prediction block is generated using the received reference picture index and the restored motion vector.

Also, a residual block is restored through entropy decoding, inverse scan, inverse quantization and inverse transform. The procedure is performed by the entropy decoding unit 210, the inverse scanning unit 221, the inverse quantization unit 222 and the inverse transform unit 223 of the decoding apparatus of FIG. 3.

Finally, a reconstructed block is generated using the prediction block and the residual block.

While the invention has been shown and described with reference to certain exemplary embodiments thereof, it will be understood by those skilled in the art that various changes in form and details may be made therein without departing from the spirit and scope of the invention as defined by the appended claims.

The invention claimed is:

1. A method of decoding a moving picture, comprising:
   a step of generating a prediction block of a current prediction unit; and
   a step of generating a residual block of the current prediction unit,
   wherein the step of generating the prediction block of the current prediction unit includes the steps of:
      obtaining a reference picture index and motion vector difference of the current prediction unit from a received bit stream;
      constructing a motion vector candidate list using available spatial and temporal motion vector candidates;
      determining a motion vector candidate indicated by a motion vector index as a motion vector predictor and restoring a motion vector of the current prediction unit using the motion vector difference and the motion vector predictor; and generating a prediction block of the current prediction unit using the restored motion vector and the reference picture index, wherein the temporal motion vector candidate is a first available motion vector encountered when retrieving two blocks corresponding to the current prediction unit or a motion vector of a predetermined block, wherein the step of generating the residual block of the current prediction unit includes the steps of:

entropy-decoding residual signals;

inversely scanning the residual signals using a first scan pattern;

restoring a transform block by inversely quantizing a quantized transform block; and inversely transforming the transform block, and wherein, when a size of the transform block is larger than a first reference size, the residual signals are inversely scanned in a unit of subsets and a scan pattern for scanning a plurality of subsets is the same as a scan pattern for scanning residual signals of each subset.

2. The method of claim 1, wherein the step of generating the prediction block of the current prediction unit further includes the steps of:

restoring a reference picture index and a differential motion vector of the current prediction unit from a received bit stream;

constructing a motion vector candidate list using available spatial and temporal motion vector candidates;

determining a motion vector candidate indicated by a motion vector index as a motion vector predictor; and restoring a motion vector of the current prediction unit using the differential motion vector and the motion vector predictor.

3. The method of claim 2, wherein, when the current prediction unit is located at a below border of a current maximum coding unit, the temporal motion vector candidate is a motion vector of a center block including an above-left pixel or a below-left pixel of center position of a block corresponding to the current prediction unit within a temporal motion vector candidate picture.

4. The method of claim 2, wherein, when a left spatial motion vector of the current prediction unit is scaled, an above spatial motion vector of the current prediction unit to be scaled is set to unavailable.

* * * * *